US007526479B2

(12) United States Patent
Zenz

(10) Patent No.: US 7,526,479 B2
(45) Date of Patent: Apr. 28, 2009

(54) CONFIGURATION MANAGER IN ENTERPRISE COMPUTING SYSTEM

(75) Inventor: Ingo Zenz, Epfenbach (DE)

(73) Assignee: SAP AG, Walldorf (DE)

( * ) Notice: Subject to any disclaimer, the term of this patent is extended or adjusted under 35 U.S.C. 154(b) by 641 days.

(21) Appl. No.: 10/749,957

(22) Filed: Dec. 30, 2003

(65) Prior Publication Data
US 2005/0144610 A1 Jun. 30, 2005

(51) Int. Cl.
G06F 7/00 (2006.01)
G06F 15/177 (2006.01)

(52) U.S. Cl. .......................... 707/8; 707/101; 707/102; 707/103 X; 707/104.1; 707/204; 709/220; 709/221

(58) Field of Classification Search ................. 707/100, 707/101, 102, 103 Y, 104.1, 8, 10, 201, 203, 707/204, 205, 103 X; 709/203, 227, 205, 709/223, 221, 220; 717/174; 713/2
See application file for complete search history.

(56) References Cited

U.S. PATENT DOCUMENTS

| | | | |
|---|---|---|---|
| 4,939,724 A | 7/1990 | Ebersole | |
| 5,553,239 A | 9/1996 | Heath et al. | |
| 6,003,075 A | 12/1999 | Arendt et al. | |
| 6,014,669 A | 1/2000 | Slaughter et al. | |
| 6,300,948 B1 | 10/2001 | Geller et al. | |
| 6,366,915 B1 | 4/2002 | Rubert et al. | |
| 6,564,261 B1 | 5/2003 | Gudjonsson et al. | |
| 6,658,018 B1 | 12/2003 | Tran et al. | |
| 6,886,035 B2 | 4/2005 | Wolff | |
| 6,892,231 B2 | 5/2005 | Jager et al. | |
| 6,944,829 B2 | 9/2005 | Dando | |
| 6,954,757 B2 | 10/2005 | Zargham et al. | |
| 6,973,473 B1 | 12/2005 | Novaes et al. | |
| 7,047,497 B2 | 5/2006 | Patrizio et al. | |
| 7,072,934 B2* | 7/2006 | Helgeson et al. ............ 709/203 |
| 7,093,247 B2 | 8/2006 | Ashworth et al. | |
| 7,127,472 B1 | 10/2006 | Enokida et al. | |
| 7,165,189 B1 | 1/2007 | Lakkapragada et al. | |
| 7,181,731 B2 | 2/2007 | Pace et al. | |
| 7,185,071 B2 | 2/2007 | Berg et al. | |
| 7,228,369 B2 | 6/2007 | Nakamura | |
| 7,251,662 B2 | 7/2007 | Behman et al. | |
| 2002/0069272 A1 | 6/2002 | Kim et al. | |
| 2002/0078132 A1 | 6/2002 | Cullen et al. | |

(Continued)

OTHER PUBLICATIONS

Nuno Preguica et al., "Data Management Support for Asynchronous Groupware", ACM, 2000, pp. 69-78.*

(Continued)

*Primary Examiner*—Thuy N Pardo
(74) *Attorney, Agent, or Firm*—Blakely, Sokoloff, Taylor & Zafman, LLP

(57) ABSTRACT

A system and method are described for managing a plurality of application servers. In one embodiment, the application servers are organized into groups referred to as "instances." Each instance includes a group of redundant application servers and a dispatcher for distributing service requests to each of the application servers. A group of instances may be organized as a "cluster." Each server includes a configuration manager to facilitate changes to configuration information within the cluster. The configuration manager may include a configuration cache and monitor its consistency with respect to other instances within the cluster.

23 Claims, 9 Drawing Sheets

U.S. PATENT DOCUMENTS

| | | | |
|---|---|---|---|
| 2002/0161750 A1 | 10/2002 | Rajarajan et al. | |
| 2002/0161870 A1 | 10/2002 | French et al. | |
| 2003/0093420 A1 | 5/2003 | Ramme | |
| 2003/0120760 A1* | 6/2003 | Fortin et al. | 709/221 |
| 2003/0167331 A1* | 9/2003 | Kumar et al. | 709/227 |
| 2004/0010502 A1* | 1/2004 | Bomfim et al. | 707/100 |
| 2004/0019639 A1* | 1/2004 | E et al. | 709/205 |
| 2004/0019662 A1 | 1/2004 | Viswanath et al. | |
| 2004/0128370 A1 | 7/2004 | Kortright | |
| 2004/0148183 A1 | 7/2004 | Sadiq | |
| 2004/0148369 A1* | 7/2004 | Strassner | 709/221 |
| 2004/0153639 A1* | 8/2004 | Cherian et al. | 713/2 |
| 2004/0249904 A1 | 12/2004 | Moore et al. | |
| 2004/0249918 A1* | 12/2004 | Sunshine | 709/223 |
| 2004/0254584 A1 | 12/2004 | Sarin et al. | |
| 2004/0260748 A1 | 12/2004 | Springer et al. | |
| 2004/0260773 A1 | 12/2004 | Springer | |
| 2005/0015471 A1 | 1/2005 | Zhang et al. | |
| 2005/0055686 A1 | 3/2005 | Buban et al. | |
| 2005/0114315 A1 | 5/2005 | Tanner et al. | |
| 2005/0251500 A1* | 11/2005 | Vahalia et al. | 707/1 |
| 2005/0268294 A1 | 12/2005 | Petev et al. | |
| 2006/0001262 A1* | 1/2006 | Bormioli | 285/314 |
| 2006/0010438 A1* | 1/2006 | Brady et al. | 717/174 |
| 2006/0106590 A1 | 5/2006 | Tseng et al. | |
| 2009/0019139 A1* | 1/2009 | Strassner | 709/220 |

OTHER PUBLICATIONS

Jan Killmeyer Tudor, "Information Security Architechture- An Integrated Approach to Security in the Organization", 2001, CRC Press LLC, pp. 1-12.*

Peter Davis, "Securing and controlling CISCO Routers", 2002, CRC Press LLC, pp. 1-29.*

Oetiker, Tobias, "SEPP Software Installation and Sharing System", *Proceedings of the Twelfth Systems Administration Conference LISA '98*), Boston, Massachusetts, (Dec. 6-11, 1998), pp. 253-260.

"Office Action for U.S. Appl. No. 10/749,851", mailed Oct. 15, 2008, Whole document.

Rohland, Hans-Christoph, et al., Non-Final Office Action dated Oct. 3, 2007, U.S. Appl. No. 10/750,002, filed Dec. 30, 2003, 18 pgs.

Rohland, Hans-Christoph, et al., Final Office Action dated Apr. 14, 2008, U.S. Appl. No. 10/750,002, filed Dec. 30, 2003, 26 pgs.

* cited by examiner

| 402 | ConfigurationHandler |
|---|---| public Configuration createRootConfiguration(String name)
public Configuration openConfiguration(String path, Intaccessmode)
public void closeConfiguration(String path)
public void closeAllConfigurations()
public void addConfigurationChangedListener
(ConfigurationChangedListener listener, String path)

public void commit()
public void rollback()

| 404 | Configuration |
|---|---|

//Managing Configuration Entries
void addConfigEntry(String name, Object value)
void addConfigEntries(Map list)
void modifyConfigEntry(String name, Object value)
void modifyConfigEntries(map list)
Object getConfigEntry(String name)
Map getConfigEntries(String names)
Map getAllConfigEntries()
void deleteConfigEntry(String name)
void deleteConfigEntries(String names)
void deleteAllConfigEntries()

// Managing (Sub) Configurations
Configuration createSubConfiguration(String name)
Configuration getSubConfiguration(String relativePath)
Map getSubConfiguration(String list)
Map getAllSubConfigurations()
void deleteConfiguration(String name)
void delteConfiguration()
void deleteSubConfigurations(String names)
void deleteAllSubConfigurations()

//Manging Files
void addFileEntry(File 1)
void addFileEntries(Map list)
void updateFile(File 1)
voide updateFiles(Map list)
InputStream getFile(String name)
Map getFileEntries(Strin names)
Map getAllFileEntries()
void deleteFile(String file)
void deleteFiles(Stirrng files)
void deleteAllFiles()

FIG. 4B

CONFIGURATION MANAGER IN ENTERPRISE COMPUTING SYSTEM

BACKGROUND

1. Field of the Invention

Embodiments of the invention relates generally to the field of data processing systems. More particularly, the embodiment of the invention relates to management of configuration information in an enterprise computing system.

2. Background

Traditional client-server systems employ a two-tiered architecture. Applications executed on the client side of the two-tiered architecture are comprised of a monolithic set of program code including a graphical user interface component, presentation logic, business logic and a network interface that enables the client to communicate over a network with one or more servers. A database maintained on the server provides non-volatile storage for the data accessed and/or processed by the application.

The "business logic" component of the application represents the core of the application, i.e., the rules governing the underlying business process (or other functionality) provided by the application. The "presentation logic" describes the specific manner in which the results of the business logic are formatted for display on the user interface. The "database" includes data access logic used by the business logic to store and retrieve data.

The limitations of the two-tiered architecture become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed. In the multi-tiered system, the presentation logic, business logic and database are logically separated from the user interface of the application. These layers are moved off of the client to one or more dedicated servers on the network. For example, the presentation logic, the business logic, and the database may each be maintained on separate servers. In fact, depending on the size of the enterprise, each individual logical layer may be spread across multiple dedicated servers.

This division of logical components provides a more flexible and scalable architecture compared to that provided by the two-tier model. For example, the separation ensures that all clients share a single implementation of business logic. If business rules change, changing the current implementation of business logic to a new version may not require updating any client-side program code. In addition, presentation logic may be provided which generates code for a variety of different user interfaces, which may be standard browsers such as Internet Explorer® or Netscape Navigator®.

A multi-tiered architecture may be implemented using a variety of different application technologies at each of the layers of the multi-tier architecture, including those based on the Java 2 Enterprise Edition Specification v1.3, published on Jul. 27, 2001 or subsequent versions thereof (the J2EE Standard), the Microsoft .NET Framework 1.1 created by Microsoft Corporation of Redmond, Wash. (the.Net Standard) and/or the Advanced Business Application Programming ("ABAP") standard developed by SAP AG. For example, in a J2EE environment, the business layer, which handles the core business logic of the application, is comprised of Enterprise Java Bean ("EJB") components with support for EJB containers. Within a J2EE environment, the presentation layer is responsible for generating servlets and Java Server Pages ("JSP") interpretable by different types of browsers at the user interface layer.

Although the multi-tiered system provides a more flexible and scalable architecture, it also results in significant additional complexity. For example, managing multiple instances in homogenous clusters of presentation layer servers, business layer servers and databases, and the dependencies between them requires a significant amount of network administration overhead.

SUMMARY

A system, method and apparatus to facilitate management of configuration data within a cluster is described. In one embodiment, when configuration data is to be modified, the modifying node acquires a cluster wide lock for the portion of the configuration having data to be modified. After acquiring the lock, the node modifies the configuration. Representations of that portion of the configuration are then invalidated elsewhere in the cluster. The lock is then released to permit other nodes in the cluster to access the modified data.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 4B is a diagram showing details of the API provided by configuration handler 402 and configuration 404.

DETAILED DESCRIPTION OF PREFERRED EMBODIMENTS

Figure 1:
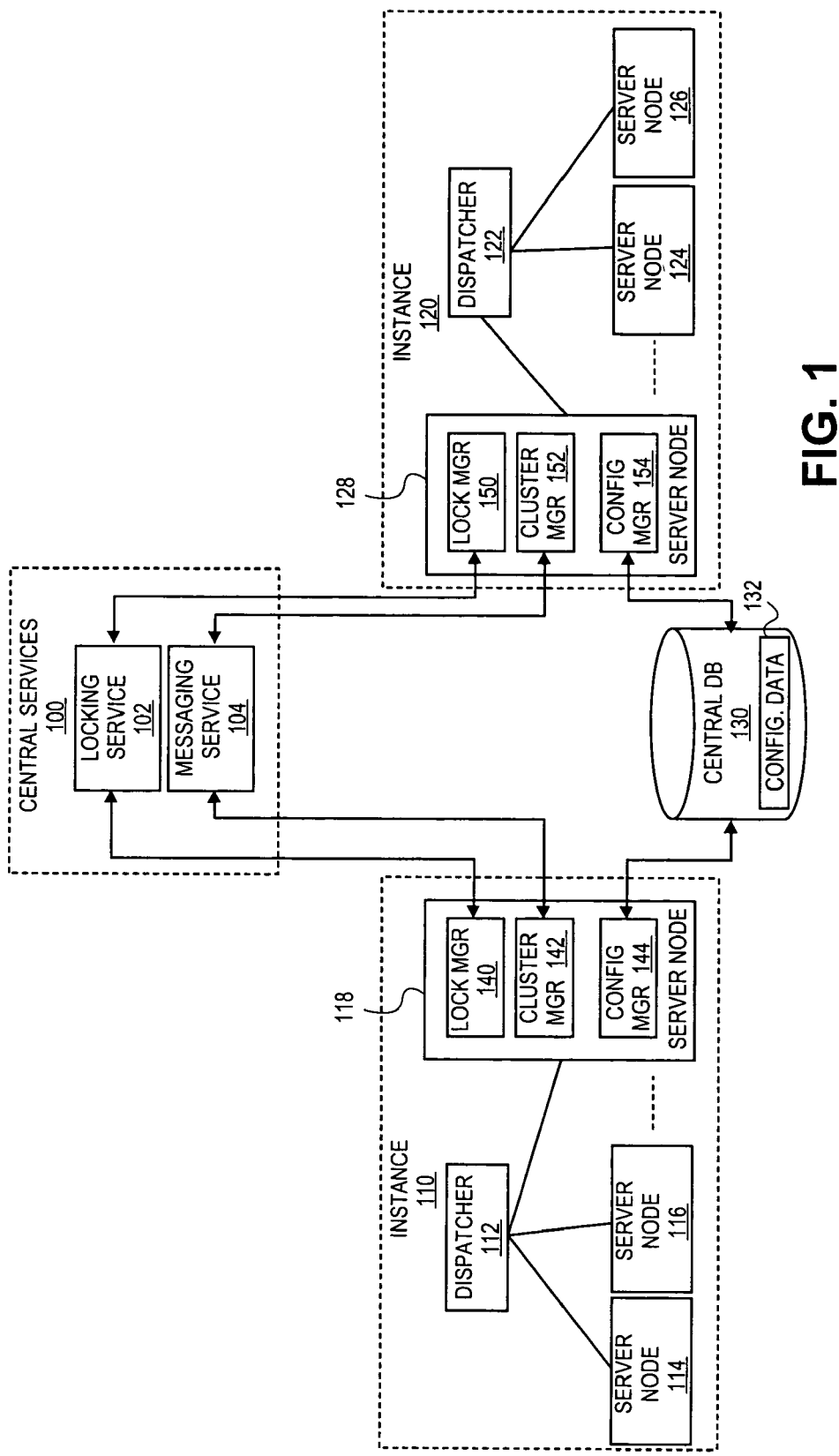
FIG. 1 is a block diagram of a system architecture according to one embodiment of the invention.

FIG. 1 is a block diagram of a system architecture according to one embodiment of the invention. The architecture includes a central services instance 100 and a plurality of application server instances 110, 120. As used herein, the application server instances, 110 and 120, each include a group of application server nodes 114, 116, 118 and 124, 126, 128, respectively, and a dispatcher, 112, 122, respectively. The central services instance 100 includes a locking service 102 and a messaging service 104 (described below). The combination of all of the application instances 110, 120 and the central services instance 100 is referred to herein as a "cluster." Although the following description will focus solely on instance 110 for the purpose of explanation, the same principles apply to other instances such as instance 120.

The application server nodes 114, 116, 118 within instance 110 provide the business and/or presentation logic for the network applications supported by the system. Each of the application server nodes 114, 116, 118 within a particular instance 110 may be configured with a redundant set of application logic and associated data. In one embodiment, the dispatcher 110 distributes service requests from clients to one or more of the application server nodes 114, 116, 118 based on the load on each of the server nodes. For example, in one embodiment, the dispatcher 110 implements a round-robin policy of distributing service requests.

The application server nodes 114, 116, 118 may be Java 2 Enterprise Edition ("J2EE") application servers which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 110, 120 is enabled via the central services instance 100. As illustrated in FIG. 1, the central services instance 100 includes a messaging service 104 and a locking service 102. The message service 104 allows each of the server nodes within each of the instances to communicate with one another via a message passing protocol. For example, messages from one server node may be broadcast to all other server nodes within the cluster via the messaging service 104 (e.g., such as the cache configuration messages described below). Alternatively, messages may be addressed directly to specific servers within the cluster (i.e., rather than being broadcast to all servers).

In one embodiment, the locking service 102 disables access to (i.e., locks) certain specified portions of configuration data and/or program code stored within a central database 130. As described in detail below, the locking service 102 enables a distributed caching architecture for caching copies of server/dispatcher configuration data.

In one embodiment, the messaging service 104 and the locking service 102 are each implemented on dedicated servers. However, the messaging service 104 and the locking service 102 may be implemented on a single server or across multiple servers in various embodiments of the invention.

As illustrated in FIG. 1, each server node (e.g., 118, 128) includes a lock manager 140, 150 for communicating with the locking service 102; a cluster manager 142, 152 for communicating with the messaging service 104; and a configuration manager 144, 154 for communicating with a central database 130 (e.g., to store/retrieve configuration data as described herein). Although the lock manager 140, 150, cluster manager 142, 152 and configuration manager 144, 154 are illustrated only with respect to server nodes 118 and 128 in FIG. 1, each of the server nodes 114, 116, 124 and 126 and/or the dispatchers 112, 122 may be equipped with equivalent lock managers, cluster managers and configuration managers in an embodiment of the invention. In one embodiment, configuration managers store persistent configuration data such as, binaries and properties in a distributed environment in a consistent way. For example, the configuration data may be distributed to configuration caches in each of the server and dispatcher nodes of the cluster.

In one embodiment, configuration data 132 defining the configuration of the central services instance 100 and/or the application servers and dispatchers within instances 110 and 120, is stored within the central database 130. By way of example, the configuration data may include an indication of the kernel, applications and libraries required by each dispatcher and server node; network information related to each dispatcher and server node (e.g., address/port number); an indication of the binaries required during the boot process for each dispatcher and server node, parameters defining the software and/or hardware configuration of each dispatcher and server node (e.g., defining cache size, memory allocation, . . . etc), and various other types of information related to the cluster. However, the underlying principles of the various embodiments of the invention are not limited to any particular set of configuration data. The configuration manager 144, 154 is responsible for ensuring the configuration is consistent across the cluster.

In one embodiment, all binaries and other configuration data relating to a J2EE engine are stored in database 130 via a configuration manager e.g., 144, 154. In such an embodiment, complete installation and configuration of the J2EE engine can be recovered from the database 130. At startup, the configuration information for the starting node may be synchronized with the database 130. This causes the new configuration to be applied on the next startup. In one embodiment, a property sheet overlies the configuration. A property sheet is a flat file with default values and optional custom values associated with various properties. In one embodiment, only the custom value is user modifiable. The property sheet may help to preserve custom settings during cluster upgrades.

In one embodiment of the invention, to improve the speed at which the various server nodes and dispatchers access the configuration data, the configuration managers 144, 154 cache configuration data locally within configuration caches (not shown). As such, to ensure that the configuration data within the configuration caches remains up-to-date (coherent), the configuration managers 144, 154 implement cache synchronization policies, as described below.

Figure 2:
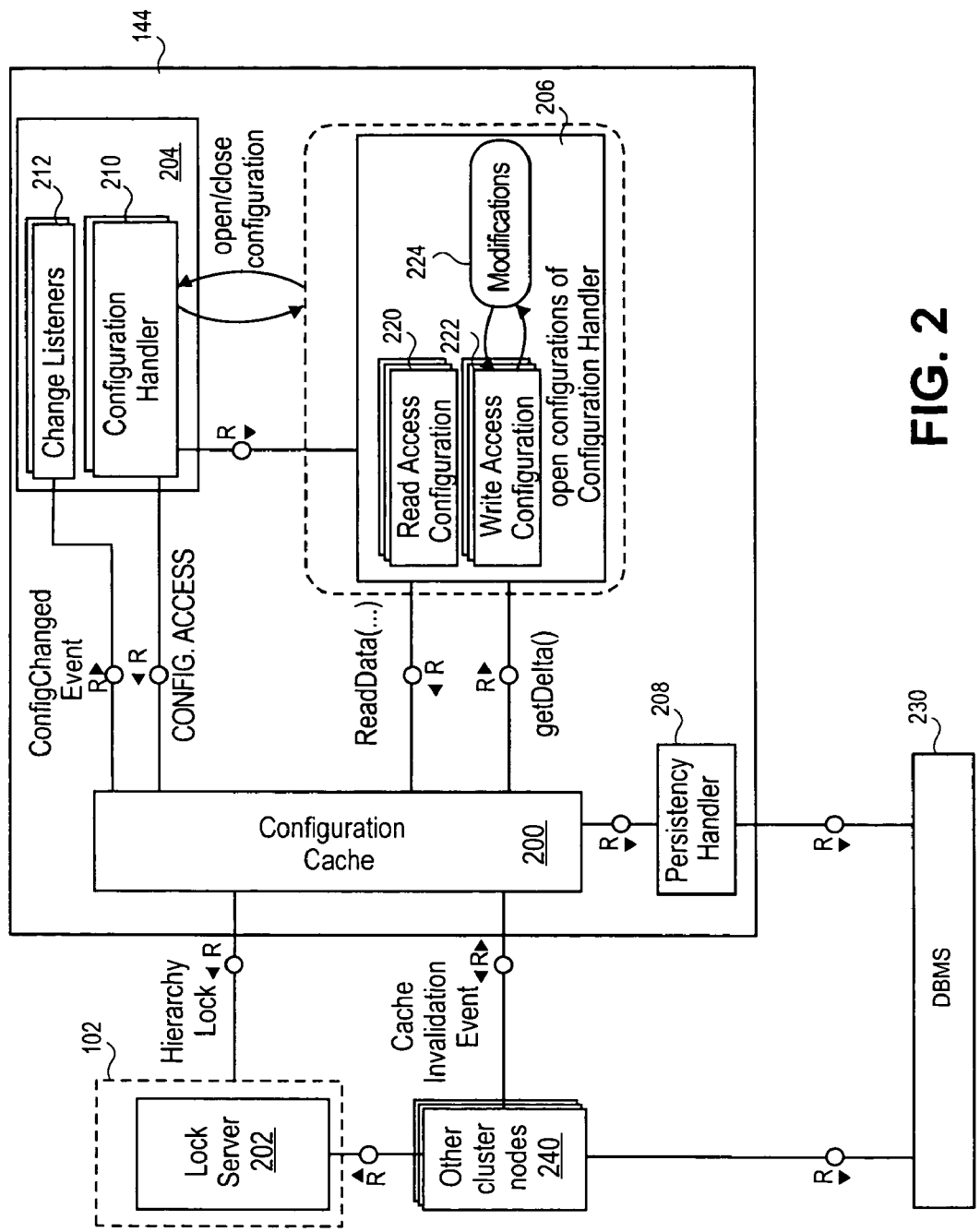
FIG. 2 is a fundamental modeling concept (FMC) diagram of the architecture of a portion of a system of one embodiment of the invention.

FIG. 2 is a fundamental modeling concept (FMC) diagram of the architecture of a portion of a system of one embodiment of the invention. Configuration manager 144 permits management and modification of configuration data within a cluster node. A configuration manager provides properties for configuring the database connection and may run on both dispatcher and server nodes within an instance. In one embodiment, the configuration manager 144 enables a J2EE engine module to store and access data from a relational database management system (RDBMS) 230. A configuration is a set of persistent objects referred to herein as configuration objects. In one embodiment, the configuration may be regarded as a tree structure having a hierarchial arrangement of configuration objects. In such an embodiment, a portion of the configuration may refer to a branch of the tree, the entire tree or any logical subdivision thereof. Configuration objects may be a set of name value pairs, set of files, and/or a set of subconfiguration objects. Configuration objects may be designated as cacheable or non-cacheable when created or during subsequent modification.

In one embodiment, configurations are stored in a database via a database management system (DBMS) 230. Configuration manager 144 includes a persistency handler 208. Persistency handler 208 is responsible for providing an interface to a persistent storage facility. In one embodiment, this may be accomplished by providing an interface to DBMS 230. If a configuration object is noncacheable or on the first time it is requested, the persistency handler 208 retrieves it from the database via the DBMS 230. If the object is cacheable, it will be retained in configuration cache 200 within configuration manager 144 for future use. In an alternative embodiment, the persistency handler may provide an interface to a file system, which serves as the persistent store.

Configuration manager 144 includes an interface 204 for components using the configuration manager. Interface 204 includes change listeners 212, which permit components, e.g. a core, services, applications, etc. to register with the change listeners 212 for change events on specific configurations (or portions thereof) within the configuration manager. The listener, e.g. the core, services application, etc., will be notified about changes to the configuration object hierarchy for which they are registered. This mechanism permits the components to receive notification when the configuration is updated and needs to be reloaded or, for example, if new applications are deployed.

Interface 204 also includes configuration handler 210, which provides an application programming interface (API) that permits access to configurations for modification and update. The configuration handler 210 can request access to the configurations by opening them in working space 206. Configuration handler 210 API provides for opening of both read access configurations 220 and write access configurations 222. The API of configuration handler 210 facilitates application of modifications 224 to the write access configurations 222. When a configuration is to be modified, the configuration manager 144 must obtain a lock for at least the portion of the hierarchy to which the configuration objects to be modified belong.

In one embodiment, a lock is obtained from the locking service 102 and more particularly from a lock server 202. Lock server 202 provides logical locks and tracks the locks distributed within the cluster. Typically, a lock provided by lock server 202 is cluster wide. Thus, when configuration 144 manager seeks to acquire write access to a configuration it requests a lock on that configuration. Once the lock is acquired, no other node in the cluster may obtain write access to that configuration until the lock is released. In one embodiment, other nodes 240 may obtain read access to the configuration for which configuration manager 144 has write access. In one embodiment, if a node is granted read access and a node with write access commits configuration change, the reading node will receive an exception so the reading node is aware that the configuration read has been changed. This is referred to as optimistic locking because the reader is only effected if the node having write access actually makes a change, rather than by the mere acquisition of write access. After modification of the write access configuration, configuration manager 144 commits the changes and initiates the sending of a cache invalidation event to other nodes 240 in the cluster to cause the configuration that has been modified to be invalidated in the other configuration caches of the cluster. Committing the changes involves updating the central database to reflect the modifications to the configuration, e.g., writing the changes back to the central database. Configuration modification process is described in more detail below in connection with FIGS. 5A & 5B.

Figure 3:
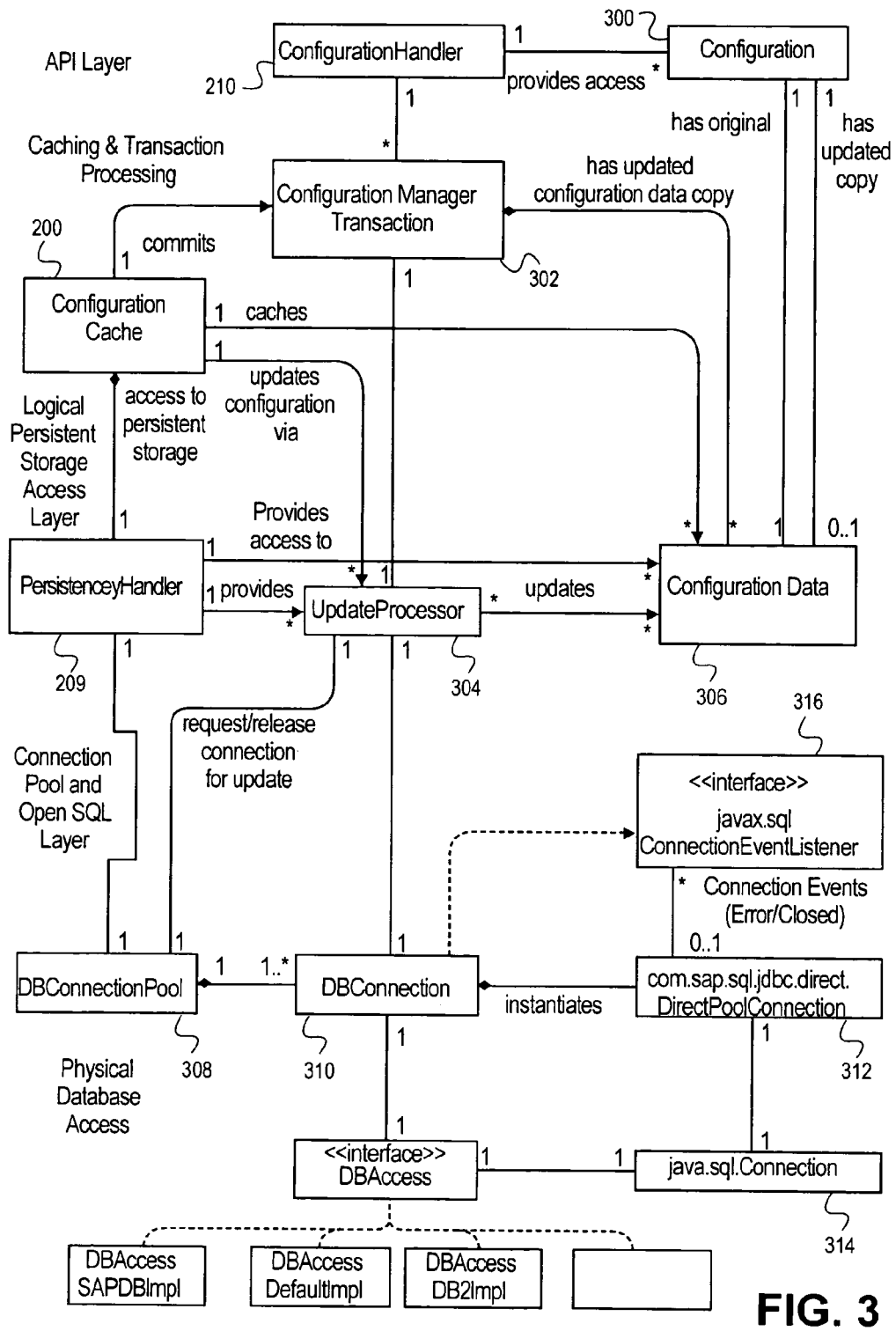
FIG. 3 is an FMC diagram showing relationships between components in one embodiment of the invention.

FIG. 3 is an FMC diagram showing relationships between components in one embodiment of the invention. During a configuration manager transaction 302, configuration handler 210 provides access to a configuration 300. Configuration 300 has either an original or an updated copy of configuration data 306. A configuration manager transaction 302, therefore has an updated configuration data copy. Configuration cache 200 commits the configuration manager transaction. During commit, the configuration cache 200 calls the persistency handler 208 to get an update processor 304. The configuration cache 200 then requests the changes to the configuration (deltas) from the workspace and passes the deltas to the update processor 304 to be written to the database.

Persistency handler 208 provides the configuration cache access to persistent storage. In one embodiment, persistence storage may be a relational or other database. In one embodiment, the database may be accessed through an open structured query language (SQL) layer. In one embodiment, the persistency handler 208 obtains a database connection from a database connection pool 308 and provides it to the update processor 304.

Database connection 310 may instantiate a direct pool connection 312 with a Java SQL connection 314 to provide an interface for database access. Various database access mechanisms may be employed. Database connection 310 also watches for connection events in a connection event listener 316 to identify if a connection closes or an error occurs.

Figure 4A:
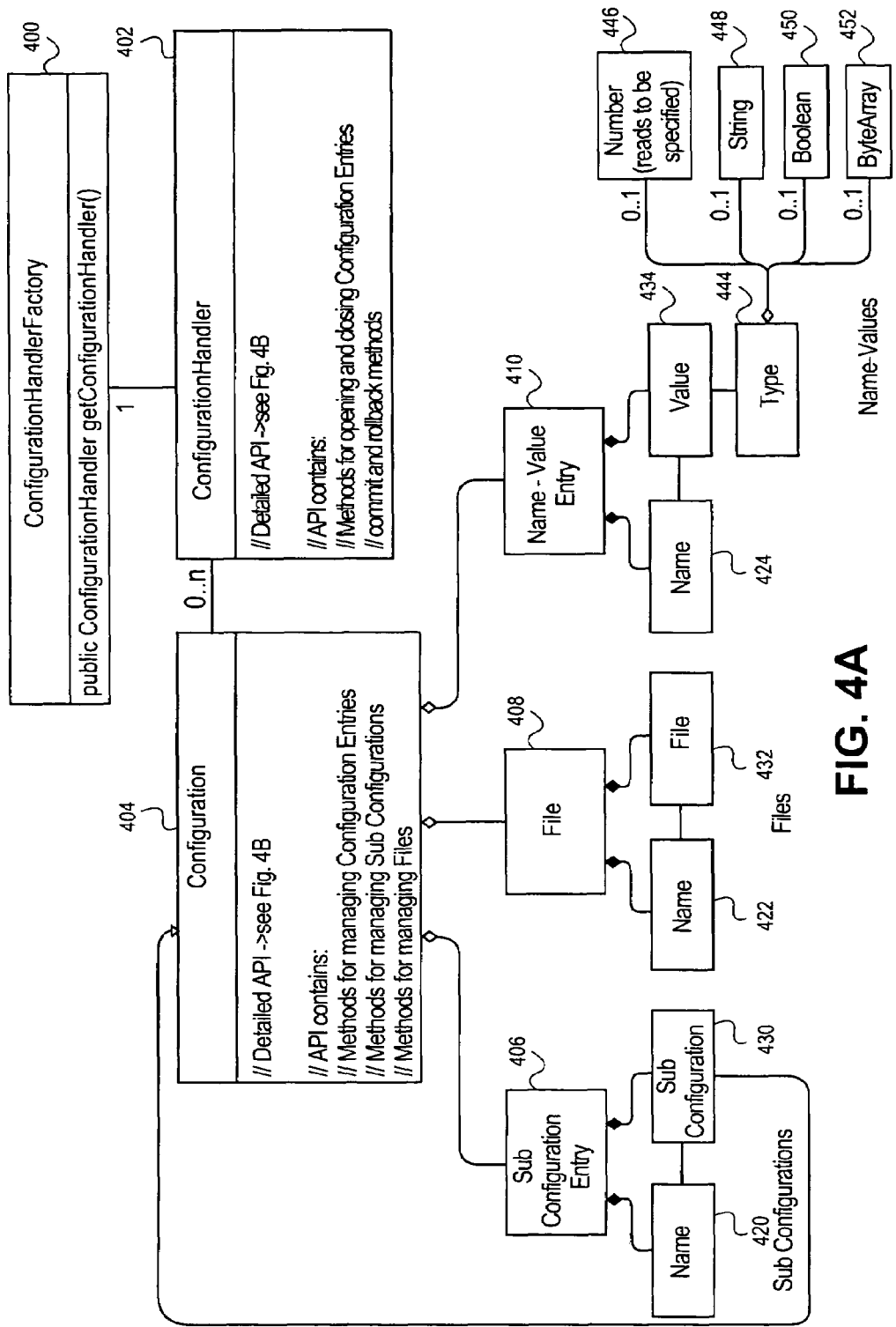
FIG. 4A is a relationship diagram showing a configuration structure of one embodiment of the invention.

FIG. 4A is a relationship diagram showing a configuration structure of one embodiment of the invention. Configuration handler factory 400 gets a configuration handler using the get Configuration Handler call. The configuration handler 402 provides an API containing methods for opening and closing configurations. The API of configuration handler 402 also provides methods for committing and rolling back changes to configurations. Configuration 404 provides an API that contains methods for managing name value entry methods for managing subconfigurations and methods for managing files. Name value entries, subconfigurations, and files fall generally within the category of configuration objects. A subconfiguration entry 406 includes the name 420 and the subconfiguration 430, which is recursive with the configuration 404. Thus, subconfiguration 430 may have a further subconfiguration, a file or a name value entry there under. File 408 has a name 422 and an associated file 432. A name value entry 410 has a name 424 value, 434 the value has a type 444 which may be, for example, a number 446 a string 448, Boolean 450 or byte array 452. FIG. 4B is a diagram showing details of the API provided by configuration handler 402 and configuration 404.

Figure 4C:
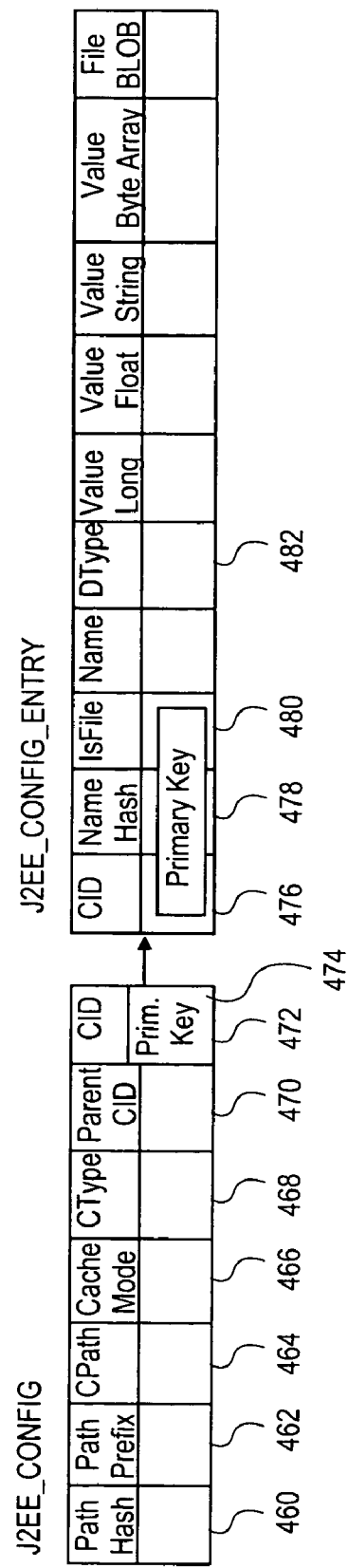
FIG. 4C is a diagram of mapping to a relational database in one embodiment of the invention.

FIG. 4C is a diagram of mapping to a relational database in one embodiment of the invention. Since strings longer than 255 bytes cannot be indexed, the path hash field 460 serves as an index for direct access. If multiple results are found from a select on the path hash 460, the correct configuration can be found based on the full path 464. The path prefix field 462 contains a maximum of 255 bytes with a unicode of the path. This permits selection of a whole subtree of a configuration using a "like" condition with the path prefix 462 as the index. The configuration path (C Path) field 464 contains the full path for the configuration. The cache mode field 466 indicates whether the configuration is cacheable or not. The configuration type field 468 (C Type) allows differentiation between various types of configurations. Parent configuration identification (Parent CID) 470 provides the identification for a parent configuration in the hierarchy. CID (configuration identification) 472 contains a primary key to access the configuration from the database. Within the configuration entry, the CID 476, the hash code of the name 478, and an indication of whether configuration entry is a file 480 form the primary key for the entry. In one embodiment, the name has a maximum of 255 characters and cannot be indexed. Including an indication of whether the entry is a file in the primary key permits a file entry and a value entry to have identical names within a single configuration. The DType field indicates the type of value in a name-value entry. The actual value will appear in the corresponding value field, while the other value fields will remain null. Both the value string field and the value byte array field may have defined limits. In one embodiment, the defined limit for the value string is a thousand characters. In one embodiment, the defined limit for the byte array field is two kilobytes. The file BLOB column may be used to store files or large volumes of data.

It should be recognized that the format and content of the configuration described with reference to FIG. 4C addresses specific limitations of certain databases supported by one embodiment of the invention. Other embodiments are not restricted to indexing less than 255 bytes and may not employ e.g., a hash code for indexing. Similarly, other embodiments are not limited to two kilobytes for byte arrays. Thus, numerous variations of the format described are contemplated as additional embodiments of the invention.

Figure 5A:
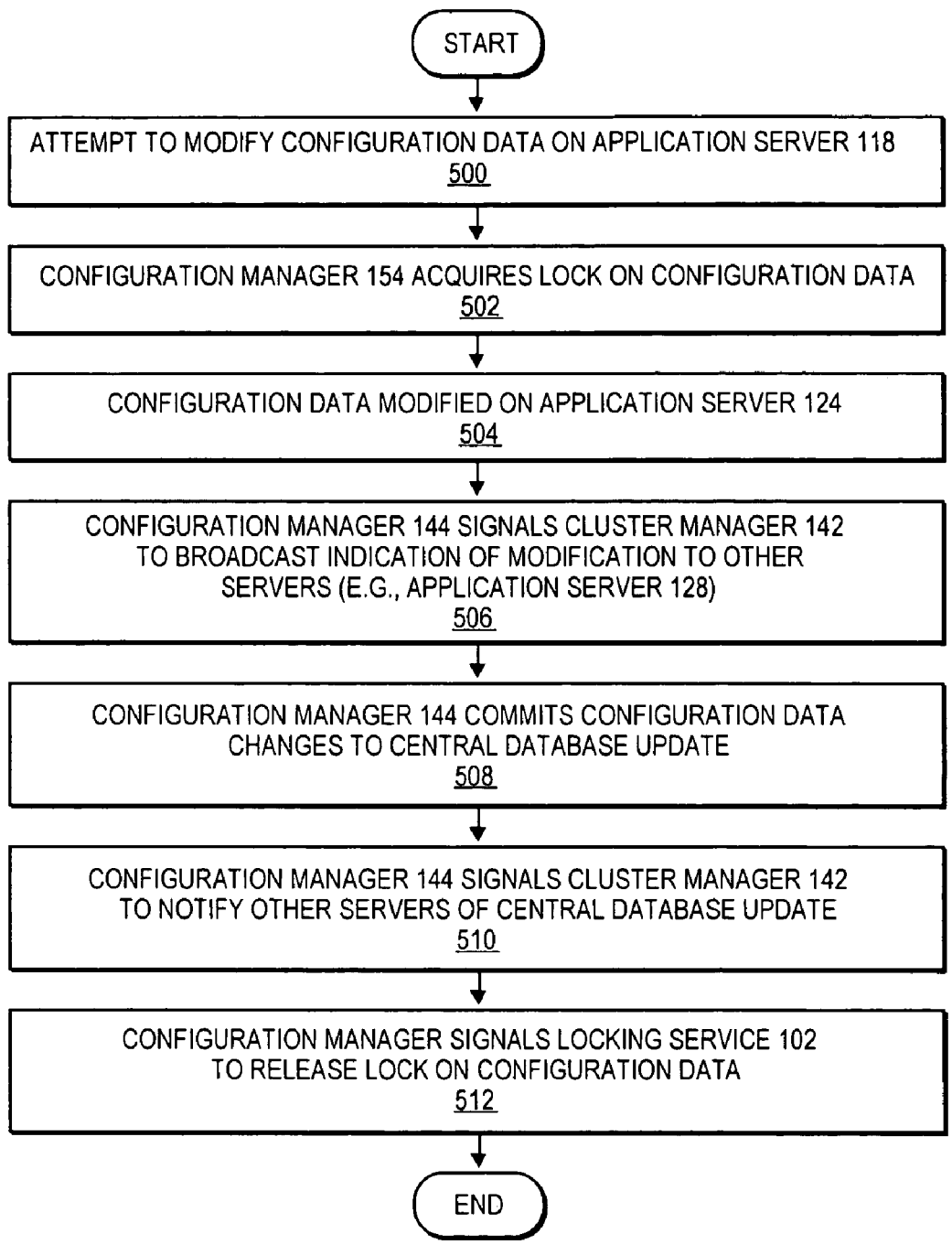
FIG. 5A is a flow diagram of activity in a node performing configuration modifications in one embodiment of the invention.

FIG. 5A is a flow diagram of activity in a node performing configuration modifications in one embodiment of the invention. At block 500, a user or network administrator attempts to modify the configuration data on application server 118. In one embodiment, a configuration handler 212 attempts to open a configuration with write access. Simultaneously, the configuration manager 144 attempts to acquire a lock on the relevant portions of the configuration data by transmitting a lock request to the lock server 202. As noted above, the portion in one embodiment may be a tree structure or a branch of the tree structure. In one embodiment, the write access will not be granted until the configuration manager acquires a lock. At block 502, if write access has not been already granted for the configuration data to another node, the locking server 202 grants the lock or the configuration to the configuration manager 144 and the configuration is permitted to be opened with write access. In one embodiment, the opening of the configuration and acquisition of the lock are performed by the configuration handler. Once locked, other configuration managers of other application servers (or dispatchers) will not be permitted have write access or acquire a lock on the configuration data. In some embodiments, read access may still be granted to other configuration managers, but an exception may be generated.

At block 504, the configuration data is modified in the workspace of the configuration handler 210 on server node 118. As used herein, modifications include any change to the configuration including deployment of new applications, binaries and changes to name value pairs. In one embodiment, modifications are only visible locally until committed as described below. At block 506, the configuration manager signals the cluster manager 142 to broadcast an indication of the modified data to the cluster manager 152 on application server 128 and the cluster manager of other application servers (e.g., via the messaging service 104). This modification may also be referred to as the "before commit" message. In one embodiment, the before commit message is used to notify other nodes that read of the configuration should be blocked while the commit occurs. By blocking the read during the commit, inconsistent reads may be avoided. Any time before the commit, the changes to the configuration may be rolled back to the previously committed version. At block 508, the modifications to the configuration data are committed to the central database 130. In one embodiment, this entails updating the central database via the persistency handler to reflect the modifications made to the configuration.

At block 510, the configuration manager 144 signals the cluster manager 142 to notify the cluster manager 152 on application server 128 and the cluster managers of other application servers of the central database update. This notification may also be referred to as the "after commit" message. The configuration manager initiates the after commit message, which serves as a cache invalidation event in other nodes caching the previous version of the now modified configuration data. The after commit message also serves as a notification to the other nodes that updated configuration data is available from the central database. At this point, the other nodes are permitted to read the updated configuration data. While the configuration manager provides cluster wide notification of configuration changes it need not propagate those changes to the other nodes in the cluster. In one embodiment, registered listeners are notified of the change event once the after commit message is sent. The configuration manager then closes the configuration and releases the lock.

Figure 5B:
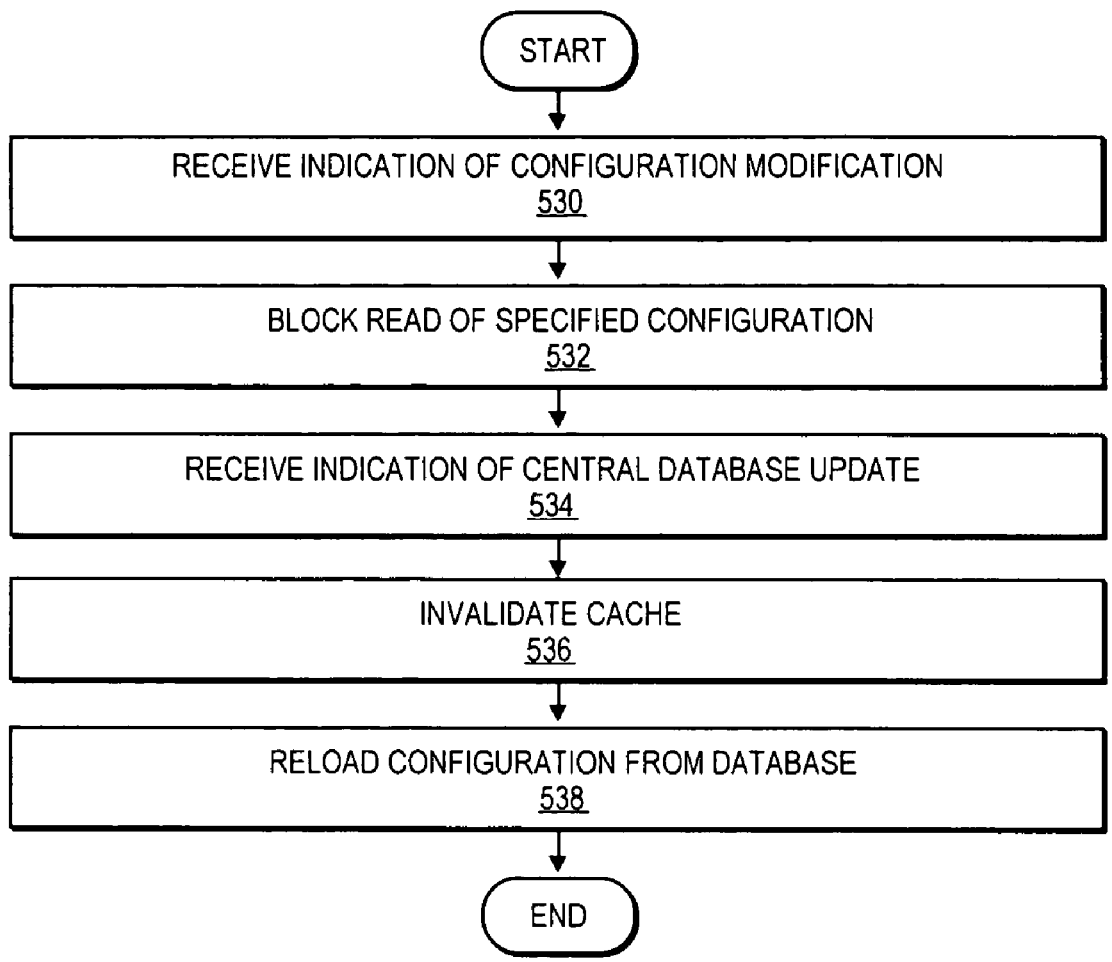
FIG. 5B is a flow diagram of activity in node that is not performing the configuration modifications.

FIG. 5B is a flow diagram of activity in a node that is not performing the configuration modifications. At block 530, the node receives an indication of configuration modification. As set forth above, this may be referred to as the before commit message. Responsive to the indication configuration modification at block 532, the node block reads of the specified configuration. By blocking the reads, inconsistent reads during the commit process are avoided. At block 534, the node receives an indication that the central database has been updated. This is also referred to as the "after commit" message as noted above. Responsive to the after commit message, the node invalidates the corresponding configuration in its configuration cache. The node may subsequently reload the configuration into the cache from the database at block 538. In one embodiment, the reload occurs responsive to the next attempt to access the configuration information that has been invalidated from the cache. In one embodiment, the configuration manager in the non-modifying nodes, only download the portion of the configuration data which has been modified (i.e., rather than the entire set of configuration data).

The method set forth in FIGS. 5A & 5B may be rearranged in a variety of ways while still complying with the underlying principles of the invention. For example, in one embodiment, the configuration manager 144 may delete the configuration data within its cache 200 as soon as the indication of the modification is transmitted at 504. Similarly, the locking service 202 may release the lock on the configuration data as soon as the changes to the configuration data are committed to the central database at 506. Various other reorganizations of the method elements from FIG. 5 are also contemplated as within the scope of the embodiment of the invention.

Figure 6:
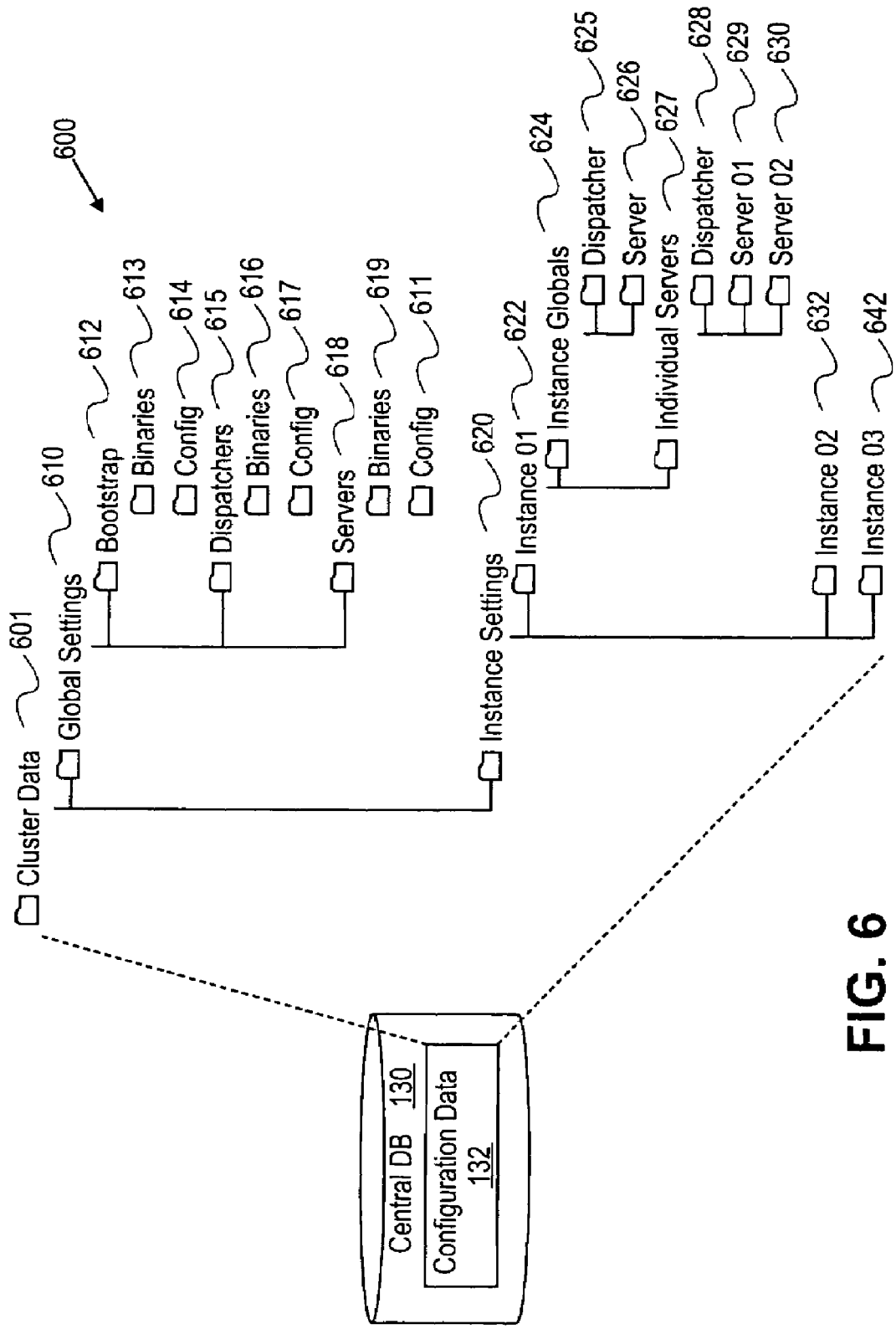
FIG. 6 is a schematic diagram of a database with configuration data according to one embodiment of the invention.

As illustrated in FIG. 6, in one embodiment, a hierarchical data object 600 stored within the central database 130 is used to manage the various different types of configuration data employed within the cluster. At the root of the hierarchy is the "cluster data" object 601. In one embodiment, the cluster data object 601 includes two primary sub-configuration objects: a "global settings" object 610 and an "instance settings" object 620. As suggested by its name, the global settings object 610 contains, within its logical hierarchy, global configuration data associated with all servers in the cluster (e.g., all application server, dispatchers, and servers within the central services instance 100). Conversely, the instance settings object 620 contains server-specific configuration data (i.e., specific to each individual instances, dispatchers and servers).

In one embodiment, three sub-configuration objects are provided beneath the global settings object 610: a "bootstrap" object 612; a "dispatchers" object 615 and a "servers" object 618. The bootstrap object 612 contains data associated with the cluster startup or "boot" process. Specifically, in one embodiment, the bootstrap object 612 contains a "binaries" object 613, which contains an indication of the binaries (i.e., program code) required during the boot process, and a "configuration" object 614 containing parameters associated with the boot process. By way of example, and not limitation, in a Java implementation, the binaries indicated within the binaries object 613 may identify the program code required for starting the Java virtual machine and the configuration object 614 may include the parameters to be used when initializing the virtual machine.

The "dispatchers" object 615 includes a "binaries" object 616 identifying the common binaries required by each of the dispatchers within the cluster, and a "configuration" object 617 identifying the common parameters associated with all of the dispatchers in the cluster. Similarly, the "servers" object 618 includes a "binaries" configuration object 619 identifying the common binaries required by each of the application servers within the cluster, and a configuration object 611 identifying the common parameters associated with each of the application servers within the cluster.

As mentioned above, the "instance settings" object 620 contains server/instance-specific configuration settings. In one embodiment, a plurality of "instance" sub-configuration objects 622, 632, 642 are listed under the instance settings object, each of which identify a particular instance within the cluster. By way of example, the "Instance 01" object 622 illustrated in FIG. 6 includes an "instance globals" object 624 and an "individual servers" object 627. The instance globals object 624 identifies binaries and settings, which apply to all dispatchers 625 and/or servers 626 within the specified instance ("Instance 01"). By contrast, the "individual servers" object 627 identifies the server layout of each instance and contains server-specific settings for each dispatcher 628 and server 629, 630 within the specified instance. For example, the "individual servers" object 627 defines the number of servers within the instance and identifies each server and dispatcher with a unique network ID and network port (i.e., for communicating with the server/dispatcher).

Although not illustrated in FIG. 6, each of the dispatcher sub-configuration objects 625, 628, and server sub-configuration objects 626, 629, 630 within the instance settings object 620 may include a separate "binaries" object and "configuration" object, identifying relevant binaries and configuration parameters, respectively. For example, a "binaries" configuration object included under the "Server 02" object 630 may identify binaries which are specific to "Server 02" within "Instance 01." Similarly, "configuration" object included under the "Server 02" object 630 may identify configuration parameters which are specific to "Server 02" within "Instance 01." FIG. 6 above merely represents one possible structure and arrangement of the configuration nodes according to one embodiment of the invention. However, the configuration manager of other embodiments of the invention may store any possible structure of configuration nodes.

Moreover, in one embodiment, the various "configuration" objects and "binaries" objects described herein may be further sub-divided into sub-configuration objects defining specific types of configuration parameters and binaries. For example, the "binaries" objects may include sub-configuration objects for the OS libraries (e.g., Java classfile libraries) and application-specific libraries required on each server. Similarly, the "configuration" objects may include sub-configuration objects, which logically subdivide the configuration parameters into logical categories.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    storing a configuration for a distributed environment, which includes a first node, in a central storage of the distributed environment; and
    updating a portion of the configuration by the first node in the distributed environment, the first node separate from the central storage, wherein updating comprises:
        acquiring a lock for the portion of the configuration by the first node in the distributed environment;
        modifying the portion of the configuration:
        invalidating a representation of the portion of the configuration in the distributed environment;
        releasing the lock;
        updating a database at the central storage to reflect modifications of the portion of the configuration; and
    blocking reads of the configuration from the database during the updating.

2. The method of claim 1 wherein updating further comprises:
    notifying nodes in the distributed environment that the configuration has been updated.

3. The method of claim 1 wherein the lock is cluster wide.

4. The method of claim 1 wherein updating further comprises:
    writing changes to a shared database at the central storage.

5. The method of claim 1 wherein modifying comprises:
    changing a configuration object in a branch of a tree structure.

6. The method of claim 1 wherein invalidating comprises:
    sending a cache invalidation event to another node in the cluster.

7. The method of claim 1 wherein invalidating comprises:
    sending a message to a plurality of Java 2 Enterprise Edition (J2EE) nodes.

8. The method of claim 1 wherein updating further comprises:
    notifying a registered listener at a second node that the configuration has been changed, the second node separate from the first node and the central storage.

9. A system comprising:
    a plurality of nodes each having an instance of a configuration manager to maintain consistent storage of a configuration across the nodes without passing configuration modifications between the nodes, a node in the plurality of nodes to update a portion of the configuration by:
  acquiring a lock for the portion of the configuration by the node;
  modifying the portion of the configuration;
  invalidating a representation of the portion of the configuration;
  releasing the lock;
  updating a shared relational database to reflect modifications of the portion of the configuration; and
  blocking reads of the configuration during update;
a locking server shared by the plurality of nodes to coordinate access to the configuration; and
a database management system to provide an interface with the shared relational database, the shared relational database to store the configuration.

10. The system of claim 9 wherein the configuration manager comprises:
  a configuration cache; and
  a configuration handler.

11. The system of claim 10 wherein the configuration manager further comprises:
  a persistency handler.

12. The system of claim 9 further comprising:
  a configuration handler to permit access to and modification of the configuration.

13. The system of claim 9 wherein the configuration comprises:
  a plurality of persistent objects holding information about a Java 2 enterprise edition cluster.

14. The system of claim 13 wherein some of the persistent objects are cacheable.

15. The system of claim 9 wherein the configuration manager comprises:
  a change event listener to notify registered components of configuration change events.

16. A computer readable storage media containing executable computer program instructions which when executed cause a digital processing system to perform a method comprising:
  storing a configuration for a distributed environment, which includes a first node, in a central storage of the distributed environment; and
  updating a portion of the configuration by the first node in the distributed environment, the first node separate from the central storage, wherein updating comprises:
    acquiring a lock for the portion of the configuration by the first node in the distributed environment;
    modifying the portion of the configuration;
    invalidating a representation of the portion of the configuration in the distributed environment;
    releasing the lock;
    updating a database at the central storage to reflect modifications of the portion of the configuration; and
    blocking reads of the configuration from the database during the updating.

17. The computer readable storage media of claim 16 containing executable computer program instructions which when executed cause a digital processing system to perform the method wherein updating comprises:
  notifying nodes in the distributed environment that the configuration has been updated.

18. The computer readable storage media of claim 16 containing executable computer program instructions which when executed cause a digital processing system to perform the method wherein updating further comprises:
  changing the configuration locally;
  writing the changes to a shared database at the central storage; and
  committing the changes.

19. The computer readable storage media of claim 16 containing executable computer program instructions which when executed cause a digital processing system to perform the method wherein invalidating comprises:
  sending a cache invalidation event to another node in the cluster.

20. The computer readable storage media of claim 16 containing executable computer program instructions which when executed cause a digital processing system to perform the method wherein updating comprises:
  notifying a registered listener at a second node that the configuration has been changed, the second node separate from the first node and the central storage.

21. A system comprising:
  means for maintaining consistent storage of configuration information in a distributed environment;
  means for controlling write access to the configuration information by nodes of the distributed environment;
  means for interfacing with a relational database system to provide persistent storage of the configuration information; and
  means for updating a portion of the configuration information by the nodes of the distributed environment, the nodes separate from the relational database system, wherein updating comprises:
    acquiring a lock for the portion of the configuration information by the nodes of the distributed environment;
    modifying the portion of the configuration information;
    invalidating a representation of the portion of the configuration information in the distributed environment;
    releasing the lock;
    updating the relational database system to reflect modifications of the portion of the configuration information; and
    blocking reads of the configuration information during the updating.

22. The system of claim 21 wherein the configuration information comprises:
  a plurality of persistent objects holding information about a Java 2 Enterprise Edition cluster.

23. The system of claim 21 wherein the means for maintaining comprises:
  a configuration cache resident in each node of the distributed environment; and a configuration handler resident in each node of the distributed environment.

* * * * *